(12) United States Patent
Itoh

(10) Patent No.: US 6,564,918 B2
(45) Date of Patent: May 20, 2003

(54) CLUTCH-ACTUATING DEVICE AND A COUPLING HAVING A RESTRICTION MECHANISM AND A CONDUIT UNIT TO BE USED WITH THE CLUTCH-ACTUATING DEVICE

(75) Inventor: Wataru Itoh, Yokosuka (JP)

(73) Assignee: Nabco, Ltd., Kobe (JP)

( * ) Notice: Subject to any disclaimer, the term of this patent is extended or adjusted under 35 U.S.C. 154(b) by 93 days.

(21) Appl. No.: 09/841,245

(22) Filed: Apr. 25, 2001

(65) Prior Publication Data

US 2001/0035327 A1 Nov. 1, 2001

(30) Foreign Application Priority Data

Apr. 26, 2000 (JP) ........................................ 2000-125576
Mar. 13, 2001 (JP) .......................................... 2001-69868

(51) Int. Cl.[7] .............................................. E16D 25/08
(52) U.S. Cl. .................................. 192/85 C; 192/109 F
(58) Field of Search ........................... 192/85 C, 109 D, 192/109 F, 30 V; 60/591; 137/513.5; 303/87

(56) References Cited

U.S. PATENT DOCUMENTS

| 4,574,834 A | * | 3/1986 | Inoue .................. 137/513.5 X |
| 4,998,609 A | * | 3/1991 | Nix et al. ................. 192/109 F |
| 5,020,864 A | * | 6/1991 | Tanaka ...................... 303/87 X |
| 5,031,969 A | * | 7/1991 | Siegel ...................... 303/87 X |
| 5,544,485 A | * | 8/1996 | Nakano et al. ........... 60/591 X |
| 5,779,019 A | * | 7/1998 | Grosspietsch et al. .... 192/85 C |
| 6,343,541 B1 | * | 2/2002 | Ebert et al. ............... 60/591 X |

FOREIGN PATENT DOCUMENTS

| JP | 58-163721 U | 10/1983 |
| JP | 59-47129 U | 3/1984 |
| JP | 61-6033 U | 1/1986 |
| JP | 2-76230 U | 6/1990 |
| JP | 4-145236 A | 5/1992 |

* cited by examiner

Primary Examiner—Richard M. Lorence
(74) Attorney, Agent, or Firm—Smith Patent Office

(57) ABSTRACT

A clutch-actuating device includes a master cylinder actuated by depression of a clutch pedal, an operating cylinder actuated by fluid pressure fed from the master cylinder through a conduit which is connected to the master cylinder or the operating cylinder via a coupling member, and a restriction mechanism for restricting the flow of hydraulic fluid returning from the operating cylinder to the master cylinder, the restriction mechanism being incorporated in the coupling member. The operating cylinder (or master cylinder) of this clutch-actuating device can be commonly used regardless of whether a torque shock protection valve should be incorporated.

9 Claims, 7 Drawing Sheets

CLUTCH-ACTUATING DEVICE AND A COUPLING HAVING A RESTRICTION MECHANISM AND A CONDUIT UNIT TO BE USED WITH THE CLUTCH-ACTUATING DEVICE

BACKGROUND OF THE INVENTION

This invention relates to a clutch-actuating device and a coupling to be used therein for a vehicle whose transmission is shifted by manual operation.

In a motor vehicle whose transmission is manually operated, a driver performs a series of operating steps including pressing down on a clutch pedal to temporarily disengage the transmission from an engine when shifting gears, changing the gear ratio by manipulating a gearshift lever, and reengaging the transmission with the engine by releasing the clutch pedal. If the clutch pedal is not properly released in this flow of the operating steps, occasionally the body of the vehicle may rock or the engine may stop due to so-called torque shocks caused by the clutch.

To overcome this problem, Japanese Unexamined Patent Publication No. 4-145236, for instance, proposes an arrangement involving the provision of a torque shock protection valve in the middle of a conduit for supplying hydraulic fluid from a master cylinder to an operating cylinder, in which the flow rate of hydraulic fluid returning from the operating cylinder to the master cylinder as a result of clutch release action is limited to prevent the occurrence of torque shocks. This torque shock protection valve is fixed to the vehicle body by means of a bracket.

The aforementioned arrangement employing the torque shock protection valve, which is constructed as an component separate from either the master cylinder or the operating cylinder, has a problem that man-hours requirements for assembly increase due to the need for fixing the valve to the vehicle body. Contrary to this, if the torque shock protection valve is shipped preassembled in a clutch-actuating device, it is difficult to maintain the torque shock protection valve unfixed to the vehicle body in a stable state during transportation.

Under such circumstances, a clutch-actuating device disclosed in Japanese Examined Patent Publication No. 2-76230, for instance, overcomes the aforementioned problems occurring at the time of assembly and during transportation by incorporating a valve element having a restriction aperture which serves as a torque shock protection valve in an operating cylinder illustrated in FIG. 2.

The torque shock protection valve may, however, be installed or not installed on a motor vehicle depending on engine displacement, for example. Therefore, if the torque shock protection valve is incorporated in the operating cylinder by machining its conduit connecting block as is the case with the aforementioned clutch-actuating device of Japanese Examined Patent Publication No. 2-76230, this operating cylinder can only be used in a motor vehicle designed to be equipped with a torque shock protection valve. Then, a problem arises that it is necessary to prepare another type of operating cylinder for motor vehicles not requiring a torque shock protection valve.

The aforementioned clutch-actuating device in which the torque shock protection valve is factory-incorporated in a specific cylinder (or in the operating cylinder) has a further problem that it spoils flexibility in the design of hydraulic circuit layout.

SUMMARY OF THE INVENTION

It is an object of the present invention to provide a clutch-actuating device, coupling, and conduit unit which are free from the problems residing in the prior art.

According to an aspect of the invention, a clutch-actuating device is provided with a master cylinder to be actuated by depression of a clutch pedal, an operating cylinder to be actuated by fluid pressure fed from the master cylinder through a conduit which is connected to the master cylinder or the operating cylinder via a coupling member, and a restriction mechanism for restricting the flow of hydraulic fluid returning from the operating cylinder to the master cylinder, the restriction mechanism being incorporated in the coupling member.

According to another aspect of the invention, a coupling having a restriction mechanism for a clutch-actuating device, the coupling being provided with a cylindrical member having a cylinder-connecting part to be connected to a port of a master cylinder or an operating cylinder at one end, and a conduit-connecting part to be connected to a conduit at the other end. The restriction mechanism restricts the flow of hydraulic fluid returning from the operating cylinder to the master cylinder, and is incorporated in a through hole formed in the cylindrical member.

According to still another aspect of the invention, a conduit unit for a clutch-actuating device is constructed by: the above-defined coupling, a coupling having a cylinder-connecting part to be connected to a port of a master cylinder or an operating cylinder at one end and a conduit-connecting part to be connected to a conduit at the other end, and a conduit for connecting the coupling having the restriction mechanism to the coupling.

These and other objects, features, aspects, and advantages of the present invention will become more apparent from the following detailed description of the preferred embodiments/examples with reference to the accompanying drawings.

DETAILED DESCRIPTION OF THE PREFERRED EMBODIMENTS OF THE INVENTION

The invention is now described in detail in connection with its preferred embodiments which are illustrated in the accompanying drawings.

Figure 1:
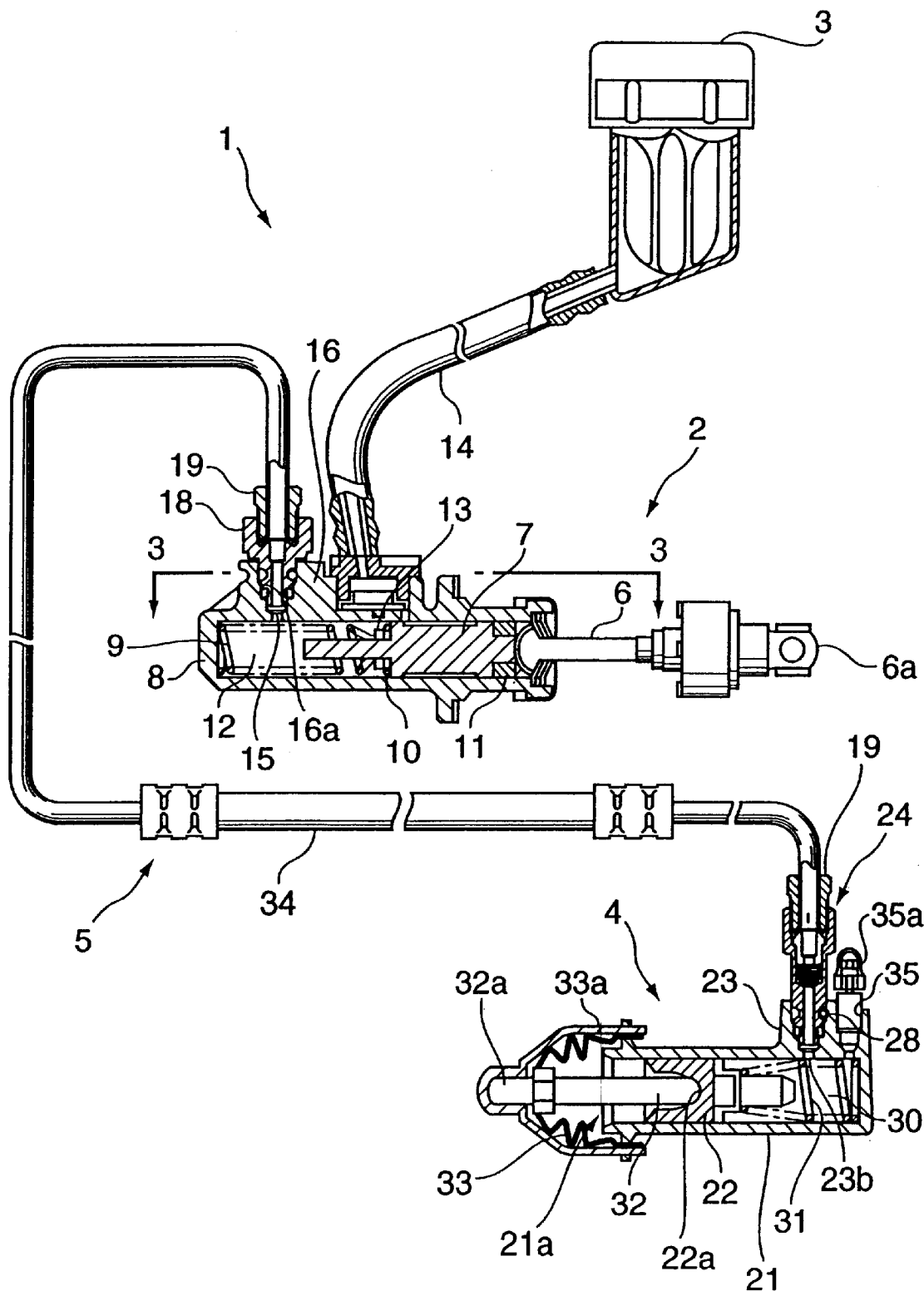
FIG. 1 is a partially sectional front view showing a general construction of a clutch-actuating device according to an embodiment of the invention.

Referring to FIG. 1 showing a general construction of a clutch-actuating device 1 according to an embodiment of the invention, the clutch-actuating device 1 mainly comprises a master cylinder 2, a reservoir 3 which supplies hydraulic fluid to the master cylinder 2, an operating cylinder 4, and a conduit 5 connecting both cylinders 2, 4.

Each of these constituent components are described below, starting with the construction of the master cylinder 2 and its associated elements.

A terminal portion 6a of a push rod 6 projecting from the master cylinder 2 is linked to an unillustrated clutch pedal. The push rod 6 is in contact with a rear end surface of a piston 7 which slides inside the master cylinder 2. There is provided a preloaded compression coil spring 9 between a forward end surface of the piston 7 and a forward inner wall 8 of the master cylinder 2. Therefore, when the clutch pedal is not depressed, the piston 7 is held at its unactuated position shown in FIG. 1 by pushing force of the compression coil spring 9. Cup seals 10 and 11 are fitted over both longitudinal ends of the piston 7.

Designated by the numeral 12 is a fluid pressure chamber formed in front of the piston 7. A passage 13 formed in a rear part of the fluid pressure chamber 12 connects to the reservoir 3 via a pipe 14. On the other hand, an outlet opening 15 is provided in a forward part of the fluid pressure chamber 12. This outlet opening 15 connects to a connecting hole 16a formed in a conduit connecting block 16 of the master cylinder 2.

Figure 2:
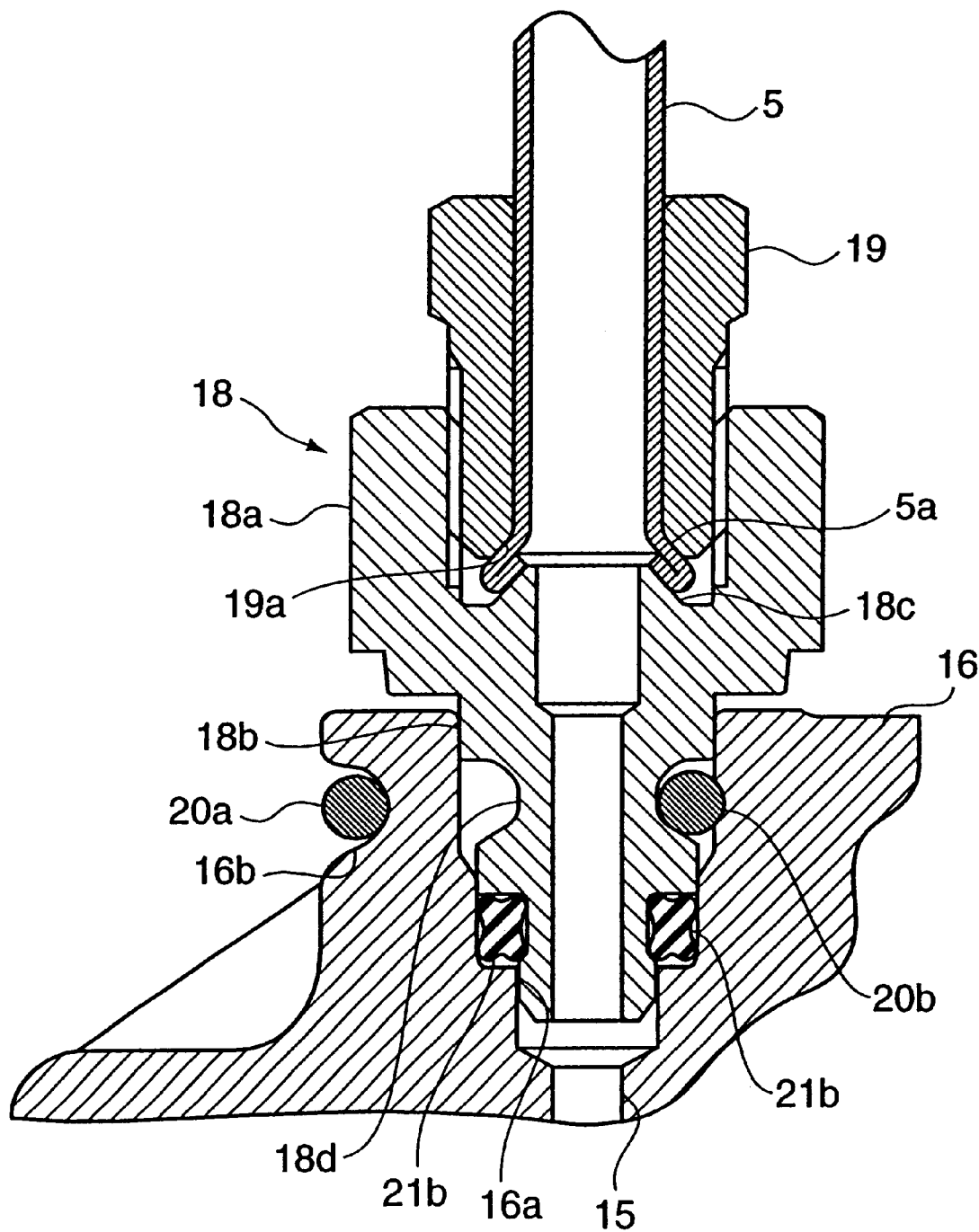
FIG. 2 is an enlarged sectional view showing a conduit connecting block and its associated elements in a master cylinder shown in FIG. 1.

One end of the conduit 5 is connected to the conduit connecting block 16 via a coupling member 18. FIG. 2 is an enlarged sectional view showing how they are joined together.

The conduit 5 is shipped already fitted with the coupling member 18 at one end as shown in FIG. 2. Formed into a generally cylindrical shape, the coupling member 18 has at its upper part a large-diameter cylindrical portion 18a into which one end of the conduit 5 is fitted, and at its lower part a small-diameter cylindrical portion 18b which is connected to the conduit connecting block 16.

On the bottom of an internal cavity of the large-diameter cylindrical portion 18a, there is formed a conical part 18c which can fit in a trumpet like widening portion 5a formed at the connecting end of the conduit 5.

Designated by the numeral 19 is a flared nut which is screwed into the large-diameter cylindrical portion 18a of the coupling member 18 with the conduit 5 fitted in the flared nut 19. When the flared nut 19 is screwed firmly into the large-diameter cylindrical portion 18a, a countersunk part 19a formed at the bottom of the flared nut 19 forces the widening portion 5a of the conduit 5 against the conical part 18c of the coupling member 18 and, as a consequence, the joint between the conduit 5 and the coupling member 18 is tightly sealed.

The coupling member 18 connected with the conduit 5 is fitted into the connecting hole 16a in the conduit connecting block 16. There is formed a circular U-shaped groove 18d in the cylindrical outer surface of the small-diameter cylindrical portion 18b of the coupling member 18, and a spring pin 20 is fitted in the U-shaped groove 18d.

Figure 3:
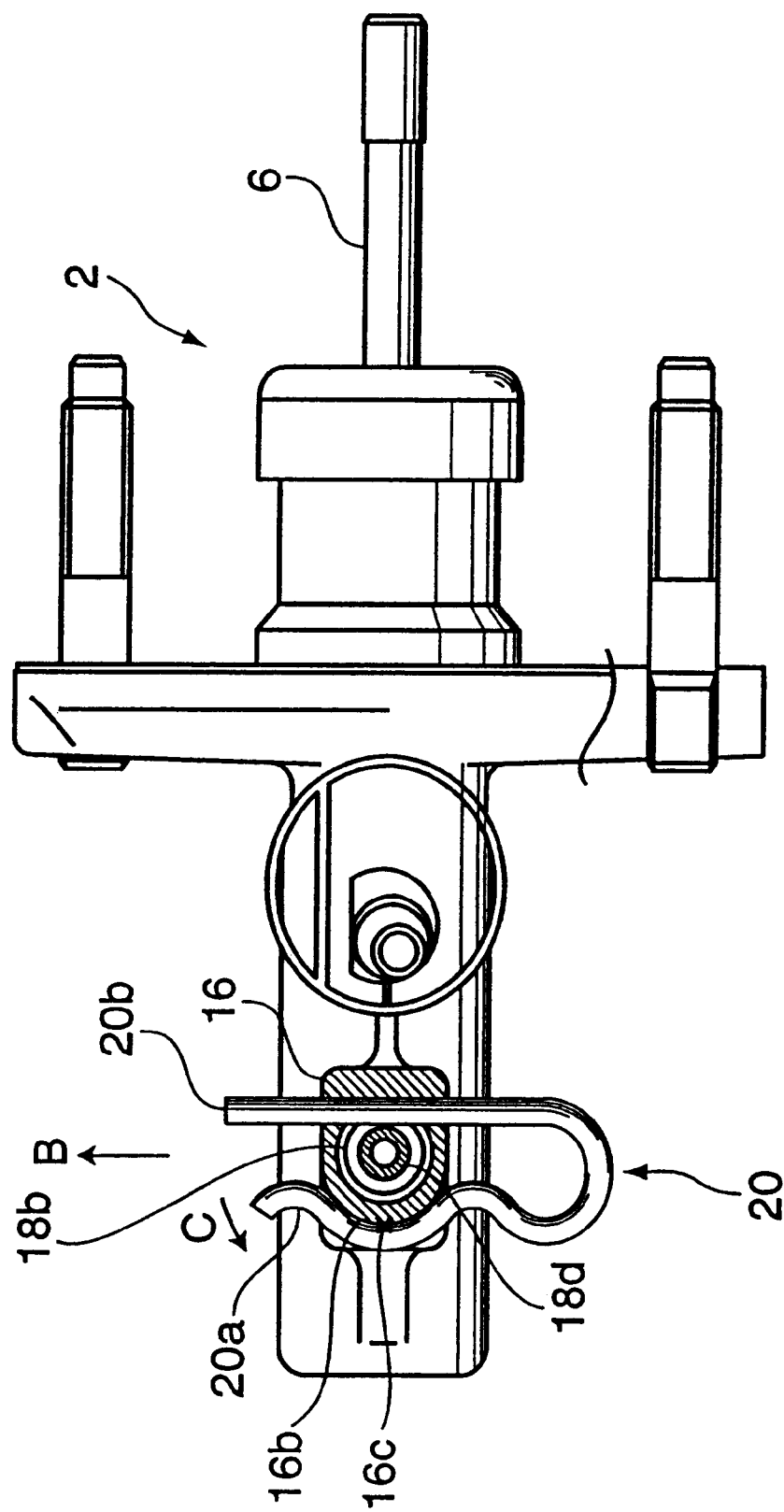
FIG. 3 is a cross-sectional plan view taken along lines 3-3 of FIG. 1.

The spring pin 20 is generally U-shaped as shown in FIG 3, which is a cross-sectional plan view taken along lines 3—3 of FIG. 1. The spring pin 20 is fitted in the direction of arrow B shown in FIG. 3 when fixing the coupling member 18 to the conduit connecting block 16. When the spring pin 20 is fitted, its curved rod portion 20a elastically deforms in the direction of arrow C and slides over an outermost part 16c of a U-shaped groove 16b formed in the outer surface of the conduit connecting block 16, whereby the curved rod portion 20a of the spring pin 20 settled in the U-shaped groove 16b.

On the other hand, a straight rod portion 20b of the spring pin 20 slides in the direction of the arrow B straight along the U-shaped groove 18d formed in the cylindrical outer surface of the small-diameter cylindrical portion 18b and fits into the U-shaped groove 18d. When the spring pin 20 has been fitted in this fashion, the coupling member 18 attached to the conduit connecting block 16 is connected to the master cylinder 2 rotatably about the vertical axis of the coupling member 18.

In FIG. 2, designated by the numeral 21b is a ring-shaped seal member which seals a contact surface between the small-diameter cylindrical portion 18b of the coupling member 18 and the connecting hole 16a formed in the conduit connecting block 16.

Now, the construction of the operating cylinder 4 and its associated elements is described.

A piston 22 is slidably fitted in a cylinder body 21 of the operating cylinder 4. At a rear end of the cylinder body 21, there is integrally formed a conduit connecting block 23, to which the other end of the conduit 5 is connected via a coupling member 24.

Figure 4:
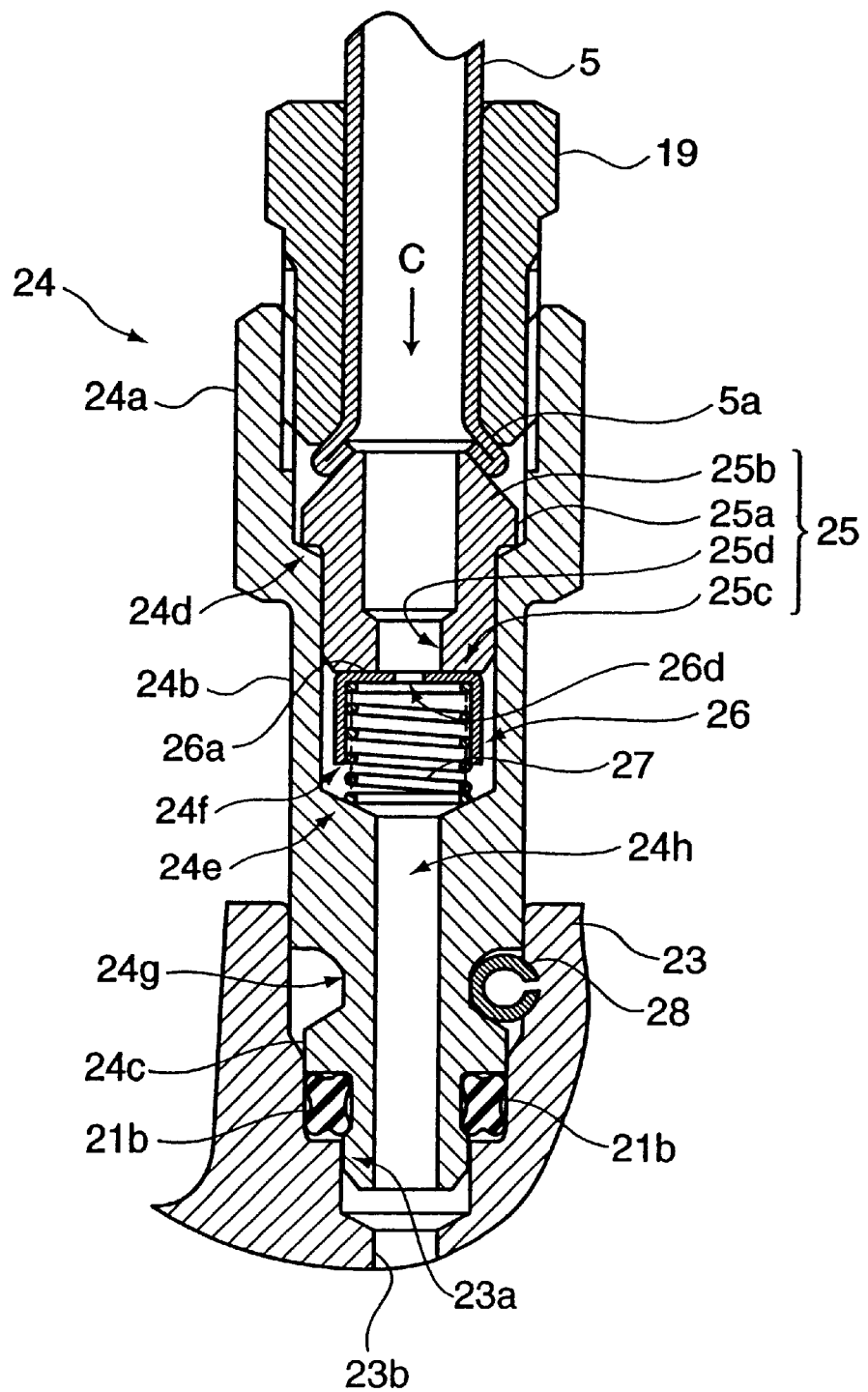
FIG. 4 is an enlarged sectional view showing a conduit connecting block and its associated elements provided to an operating cylinder shown in FIG. 1.

FIG. 4 is an enlarged sectional view showing how they are joined together. Here, elements equivalent to those shown in FIG. 2 are designated by the same reference numerals and their detailed description is omitted.

Referring to FIG. 4, the conduit 5 is shipped already fitted with the coupling member 24 at its end to be connected to the operating cylinder 4. Formed into a generally cylindrical shape, the coupling member 24 has a large-diameter cylindrical portion 24a into which the conduit 5 is fitted, a medium-diameter cylindrical portion 24b where a later-described restriction mechanism is accommodated, and a small-diameter cylindrical portion 24c which is connected to the conduit connecting block 23.

There are formed sloping stepped parts 24d and 24e in boundary areas between the large-diameter cylindrical portion 24a and the medium-diameter cylindrical portion 24b, and between the medium-diameter cylindrical portion 24b and the small-diameter cylindrical portion 24c, respectively.

Designated by the numeral 25 is a cylindrical metal part which is fitted in the medium-diameter cylindrical portion 24b. This cylindrical metal part 25 is shaped such that a flange like portion 25a formed at its upper part rests on the inner stepped part 24d of the medium-diameter cylindrical portion 24b. The uppermost part of the flange like portion 25a is shaped to form a conical part 25b whose shape matches that of a trumpet like widening portion 5a formed at the end of the conduit 5, while the bottom surface of the cylindrical metal part 25 forms a ring-shaped valve seat 25c.

With the cylindrical metal part 25 inserted in the medium-diameter cylindrical portion 24b of the coupling member 24 and positioned therein, a valve chamber 24f is formed in the medium-diameter cylindrical portion 24b. The restriction mechanism is accommodated in this valve chamber 24f.

The restriction mechanism includes a valve element 26 which is brought into contact with and separated from the valve seat 25c and a compression coil spring 27 which serves as a biasing member pushing the valve element 26 against the valve seat 25c.

Figure 5:
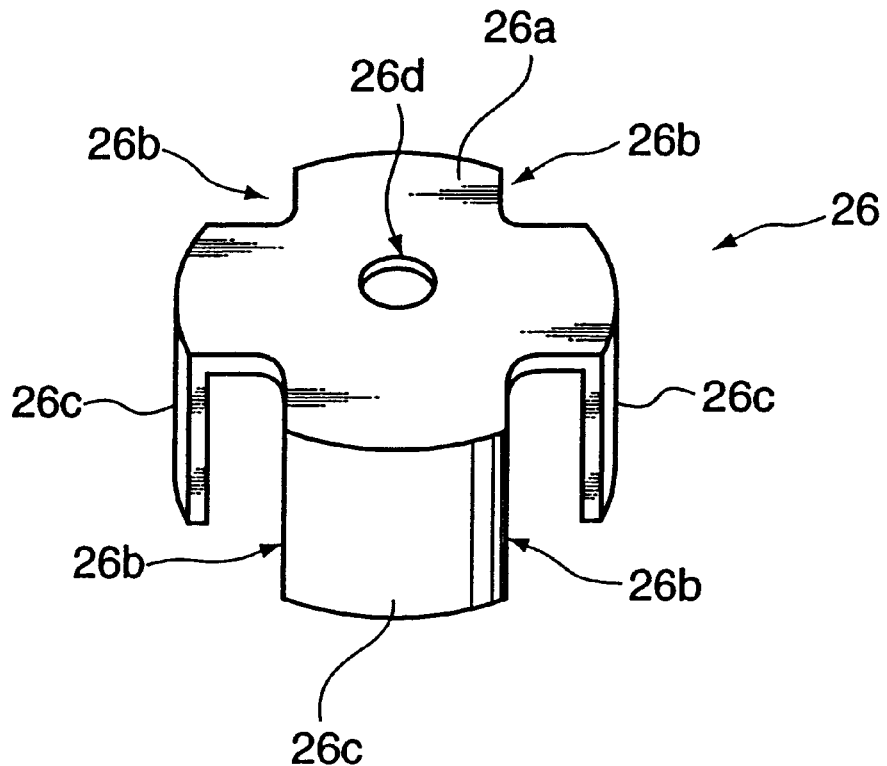
FIG. 5 is a perspective view of a valve element shown in FIG. 4.

The valve element 26 is a generally cylindrical element having a top plate 26a as shown in FIG. 5. Four cutouts 26b are formed at regular intervals in a curved side wall of the valve element 26 as illustrated. The compression coil spring 27 is fitted inside four downward-extending legs 26c of the valve element 26, the legs 26c serving as a guide that allows the valve element 26 to move up and down on a common axis with the compression coil spring 27. The valve element 26 is constructed such that the cutouts 26b do not connect to a through hole 25d formed in the cylindrical metal part 25 when the valve element 26 is in contact with the valve seat 25c. Further, there is formed a restriction aperture 26d in the top plate 26a of the valve element 26. The valve element 26 having the restriction aperture 26d serves as a flow control valve.

Referring to FIG. 4, the compression coil spring 27 fitted in the valve element 26 in a preloaded state is supported at its bottom end by the stepped part 24e of the coupling member 24. Therefore, when a downward fluid pressure is not exerted on the top plate 26a of the valve element 26, the valve element 26 is held in contact with the valve seat 25c by pushing force of the compression coil spring 27.

The coupling member 24 connected with the conduit 5 is fitted into a connecting hole 23a formed in the conduit connecting block 23 of the operating cylinder 4. There is formed a circular U-shaped groove 24g in the cylindrical outer surface of the small-diameter cylindrical portion 24c of the coupling member 24, and a spring pin 28 is fitted in part of the U-shaped groove 24g as illustrated.

Figure 6A:
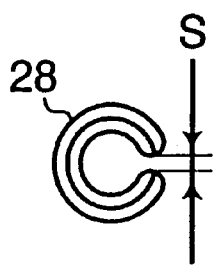
FIG. 6A is an enlarged front view of a spring pin shown in FIG. 4.
Figure 6B:
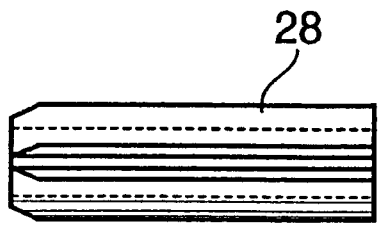
FIG. 6B is a right side view of the spring pin.

The spring pin 28 has a C-shaped cross section with a slit S formed in a cylindrical wall of the spring pin 28 as shown in FIG. 6A. The spring pin 28 has a straight structure as shown in FIG. 62. When pushed into the U-shaped groove 24g, the spring pin 28 elastically deforms causing the slit S to become narrower, and when the spring pin 28 is fully inserted, the spring pin 28 expands with its cross section increasing, thereby jointing the coupling member 24 and the conduit connecting block 23 in a reliable fashion.

In FIG. 4, designated by the numeral 21b is a ring-shaped seal member which seals a contact surface between the small-diameter cylindrical portion 24c of the coupling member 24 and the connecting hole 23a formed in the conduit connecting block 23.

Referring again to FIG. 1, there is formed a fluid pressure chamber 30 to the right of the piston 22 in the cylinder body 21 of the operating cylinder 4. A compression coil spring 31 having a relative small pushing force is placed in the fluid pressure chamber 30 to maintain the piston 22 at a specific position. The fluid pressure chamber 30 is connected to a passage 24h formed in the coupling member 24 via a through hole 23b (see also FIG. 4). A strap 33a shown in FIG. 1 serves to retain the piston 22 and an output rod 32 at the illustrated positions when transporting the operating cylinder 4. This strap 33a is removed when the operating cylinder 4 is installed on a motor vehicle.

There is formed a recessed cavity 22a in the piston 22 on its side where pushing force is exerted and a rear end of the output rod 32 is fitted into the recessed cavity 22a. A forward end 32a of the output rod 32 protrudes from a forward opening 21a of the cylinder body 21. The forward end 32a of the output rod 32 and the forward opening 21a of the cylinder body 21 are covered with a bellows-like boot 33 which can expand and contract according to back-and-forth movements of the output rod 32 while preventing intrusion of dust and dirt.

In FIG. 1, designated by the numeral 34 is a rubber hose which serves to absorb pressure pulsations produced by successive engagement and disengagement of a clutch. A bleeder port 35 is shipped closed off by fastening a screw 35a. When feeding the hydraulic fluid into the clutch-actuating device 1 upon installing it on a motor vehicle, the screw 35a is loosened to release air from inside the fluid pressure chamber 30.

Now, operation of the clutch-actuating device 1 thus constructed is described below.

When the clutch pedal is depressed and the push rod 6 moves the piston 7 leftward as illustrated in FIG. 1, the reservoir 3 is disconnected from the fluid pressure chamber 12 and fluid pressure within the fluid pressure chamber 12 increases, forcing the hydraulic fluid out through the outlet opening 15. The hydraulic fluid output from the master cylinder 2 is delivered to the operating cylinder 4 through the conduit 5.

Referring to FIG. 4, the hydraulic fluid to be supplied to the operating cylinder 4 flows in the direction of arrow C, passes through the cylindrical metal part 25 in the coupling member 24, and hits against the top plate 26a of the valve element 26. Although part of the hydraulic fluid passes through the restriction aperture 26d in the valve element 26, the pressure of the hydraulic fluid acts on the top plate 26a around the restriction aperture 26d, forcing it downward. As a result, the valve element 26 is caused to move against the pushing force of the compression coil spring 27 and separated from the valve seat 25c.

When a gap is formed between the valve element 26 and the valve seat 25c, the hydraulic fluid suddenly flows in an increased quantity through the cutouts 26b in the valve element 26 and is introduced into the fluid pressure chamber 30 of the operating cylinder 4 through the passage 24h and the through hole 23b.

As a consequence, the piston 22 moves leftward (as illustrated in FIG. 1) and the output rod 32 displaces an unillustrated clutch release lever, whereby the clutch is temporarily disengaged. As a driver changes the gear ratio by operating a shift lever and then releases the clutch pedal to engage the clutch, the output rod 32 and the piston 22 are caused to return rightward to their original positions by pushing force of the clutch release lever. Accordingly, the hydraulic fluid in the fluid pressure chamber 30 is caused to flow in the direction opposite to the arrow C and move into the valve chamber 24f through the through hole 23b and the passage 24h.

The hydraulic fluid which has flown into the valve chamber 24f applies an upward pressure to the bottom surface of the top plate 26a of the valve element 26, causing the top plate 26a to go into close contact with the valve seat 25c. As a result, the hydraulic fluid returning to the master cylinder 2 flows into the conduit 5 only through the restriction aperture 26d in the valve element 26. This means that the flow of hydraulic fluid returning to the master cylinder 2 is restricted as the valve element 26 goes into contact with the valve seat 25c and, as a consequence, the piston 22 moves to the right (as illustrated in FIG. 1) at a speed limited by the restriction aperture 26d, thereby preventing torque shocks at the time of clutch engagement.

Figure 7:
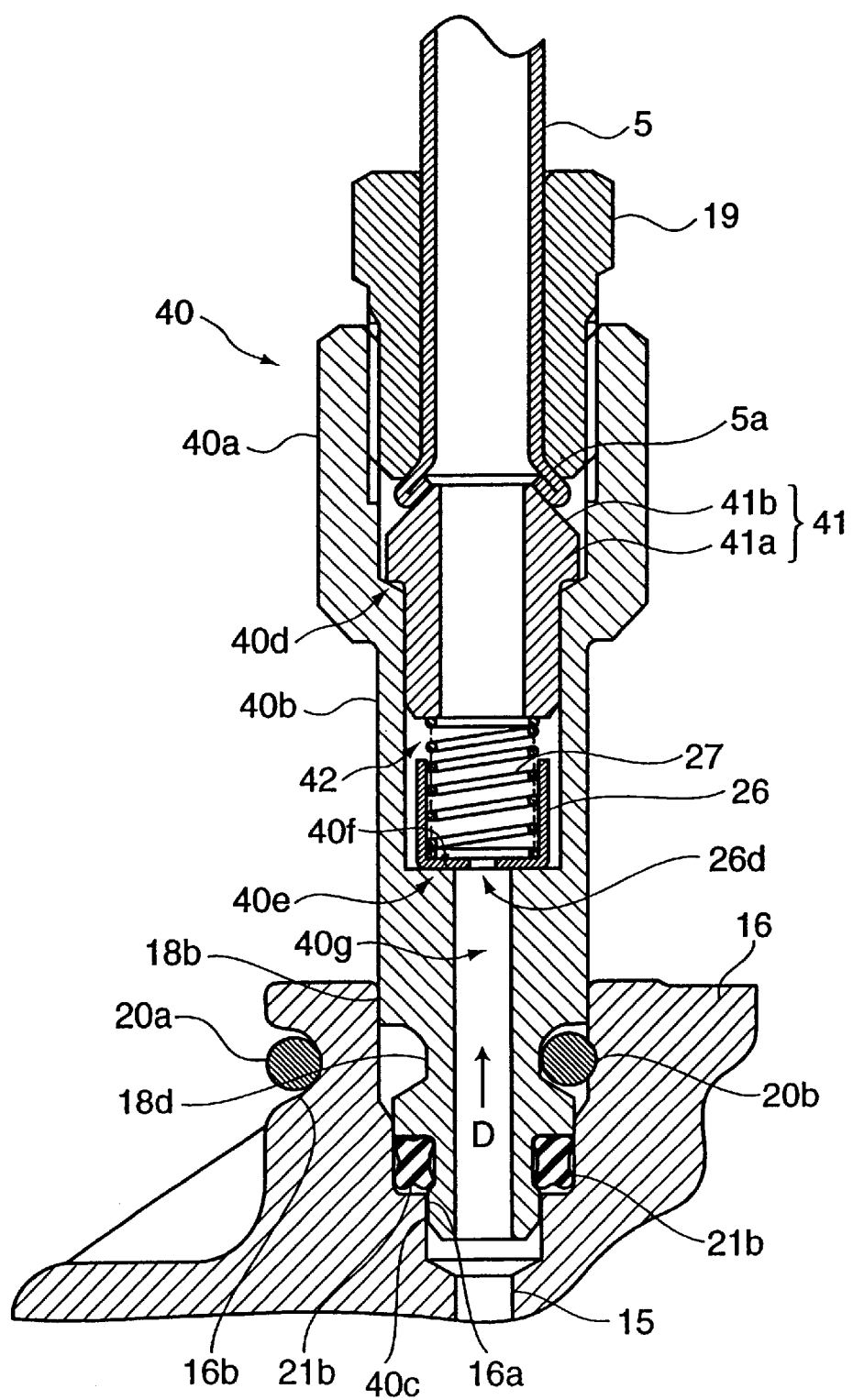
FIG. 7 is a cross-sectional view of a conduit connecting block and its associated elements provided to a master cylinder according to another embodiment of the invention.

While the coupling member 24 connected to the operating cylinder 4 incorporates the restriction mechanism in the foregoing embodiment, it may be incorporated in a coupling member 40 which is connected to the master cylinder 2 as shown in FIG. 7.

Formed into a generally cylindrical shape, the coupling member 40 of FIG. 7 has a large-diameter cylindrical portion 40a, a medium-diameter cylindrical portion 40b and a small-diameter cylindrical portion 40c like the coupling member 24 depicted in FIG. 4. There are formed stepped parts 40d and 40e in boundary areas between the large-diameter cylindrical portion 40a and the medium-diameter cylindrical portion 40b, and between the medium-diameter cylindrical portion 40b and the small-diameter cylindrical portion 40c, respectively. While the stepped part 40d is sloped, the stepped part 40e forms a horizontal plane. This means that the horizontal surface of the stepped part 40e serves as a valve seat 40f in this embodiment.

In FIG. 7, designated by the numeral 41 is a cylindrical metal part of which flange like portion 41a rests on the stepped part 40d, with a conical part 41b formed at an upper part of the flange like portion 41a. Designated by the numeral 42 is valve chamber formed in the medium-diameter cylindrical portion 40b.

A restriction mechanism accommodated in the valve chamber 42 includes a valve element 26 which is brought into contact with and separated from the valve seat 40f and a compression coil spring 27 which forces a top plate 26a of the valve element 26 against the valve seat 40f. This means that the structure of the restriction mechanism of this embodiment is equivalent to that of the earlier-described embodiment illustrated in FIG. 4 but the valve element 26 and the compression coil spring 27 arranged upside down.

According to this embodiment, hydraulic fluid supplied from the master cylinder 2 when the driver presses down on the clutch pedal flows through a passage 40g formed in the coupling member 40 in the direction of arrow D and forces the valve element 26 upward. The hydraulic fluid passing through a gap between the valve element 26 and the valve seat 40f and through a restriction aperture 26d formed in the top plate 26a of the valve element 26 flows into a conduit 5, and delivered to the operating cylinder 4, whereby the clutch is disengaged.

When the driver releases the clutch pedal, the hydraulic fluid in the fluid pressure chamber 30 of the operating cylinder 4 is caused to return to the master cylinder 2 by pushing force of the clutch release lever. As the hydraulic fluid flows through the valve chamber 42, it forces the valve element 26 downward so that the top plate 26a of the valve element 26 goes into contact with the valve seat 40f. Thus, the hydraulic fluid returning to the master cylinder 2 flows back to the master cylinder 2 only through the restriction aperture 26d. The flow of hydraulic fluid returning to the master cylinder 2 is therefore restricted in this construction as well and, as a consequence, the piston 22 moves to the right (as illustrated in FIG. 1) at a speed limited by the restriction aperture 26d, thereby preventing torque shocks at the time of clutch engagement.

While the cutouts 26b are formed in the curved side wall of the valve element 26 as shown in FIG. 5 so that the valve element 26 provides an increased fluid passage area when a gap is formed between the valve element 26 and the valve seat 25c (valve seat 40f) in the foregoing embodiments, the cutouts 26b need not be made if a sufficiently large passage area compared to the area of the restriction aperture 26d is produced between the legs 26c and the inner wall of the valve chamber 24f (valve chamber 42) when the valve element 26 is placed in the valve chamber 24f (valve chamber 42). In this case, only the restriction aperture 26d should be made in the valve element 26.

Figure 8:
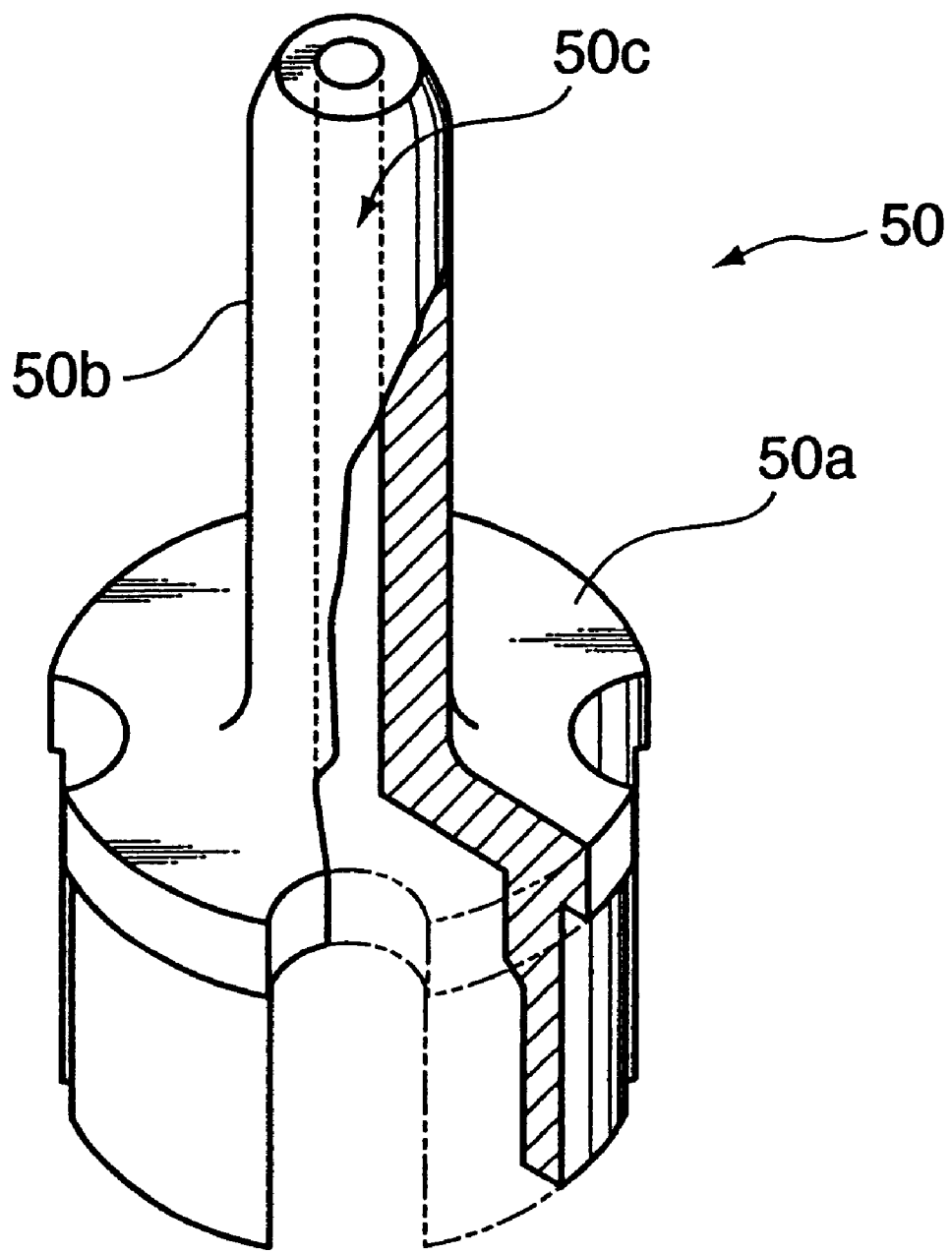
FIG. 8 is a perspective view showing a variation of the valve element.

FIG. 8 is a diagram showing a variation of the valve element 26. A valve element 50 shown in FIG. 8 has a hollow cylindrical shaft 50b extending from its top plate 50a with a restriction passage 50c formed in the cylindrical shaft 50b.

If this valve element 50 is incorporated in the coupling member 24 shown in FIG. 4, the cylindrical shaft 50b fits in the through hole 25d in the cylindrical metal part 25 allowing a play therein. If, on the other hand, the valve element 50 is incorporated in the coupling member 40 shown in FIG. 7, the cylindrical shaft 50b fits in the passage 40g allowing a play therein.

If the valve element 50 thus constructed is used, pressure loss occurs in the restriction passage 50c due to its relatively large length, eventually limiting the flow rate of returning hydraulic fluid. This serves to provide an enhanced restriction effect.

Furthermore, even when there are structural limitations in reducing the diameter of the restriction aperture in the valve element, it is possible to obtain a desired restriction effect by using the valve element 50 having an elongated cylindrical shaft 50b, without the need to making a small restriction aperture.

Referring to FIG. 4, if the valve element 26 and the compression coil spring 27 are removed from the valve chamber 24f of the coupling member 24 of the foregoing engagement, the coupling member 24 can be used in place of the coupling member 18 depicted in FIG. 2. This means that two coupling members of a common type can be used as constituents components of a clutch-actuating device.

As described above, a clutch-actuating device comprises a master cylinder to be actuated by depression of a clutch pedal, an operating cylinder to be actuated by fluid pressure fed from the master cylinder through a conduit which is connected to the master cylinder or the operating cylinder via a coupling member, and a restriction mechanism for restricting the flow of hydraulic fluid returning from the operating cylinder to the master cylinder, the restriction mechanism being incorporated in the coupling member.

In this construction, the restriction mechanism which prevents torque shocks occurring at the time of clutch engagement by restricting the flow of hydraulic fluid returning from the operating cylinder to the master cylinder is incorporated in the coupling member provided in the master cylinder or in the operating cylinder, and not in either of these cylinders. If the need should arise for a clutch-actuating device having a torque shock preventing function, therefore, it is possible to provide it simply by fitting the coupling member incorporating the restriction mechanism between the conduit and one of the cylinders.

Accordingly, the operating cylinder (or master cylinder) of the clutch-actuating device can be commonly used regardless of whether a torque shock protection valve should be incorporated. In addition, since the cylinder to which the torque shock protection valve can be mounted is not limited to a particular type, the device allows for flexibility in the design of hydraulic circuit layout.

The restriction mechanism may include a flow control valve provided in a through hole formed in the coupling member.

The flow control valve may include a valve seat formed at one end of the through hole connected to the master cylinder, a valve element which can be brought into contact with and separated from the valve seat, the valve element having a restriction aperture, and a biasing member which pushes the valve element against the valve seat. The valve element moves apart from the valve seat against pushing force of the biasing member when the hydraulic fluid is supplied from the master cylinder, and the valve element goes into contact with the valve seat when the hydraulic fluid returns to the master cylinder, allowing the hydraulic fluid to pass only through the restriction aperture to thereby limit the flow rate of returning hydraulic fluid.

In this construction, the flow control valve serving as the restriction mechanism is constructed of the valve seat formed at one end of the through hole connected to the master cylinder, the valve element which can be brought into contact with and separated from the valve seat, and the biasing member which pushes the valve element against the valve seat. This makes it possible to produce a compact restriction mechanism having a simple construction.

The restriction aperture may be formed in a cylindrical shaft extending from the valve element along the through hole.

If the through hole formed in the cylindrical shaft is used as the restriction aperture as stated above, it is possible to achieve an enhanced restriction effect using hydraulic line resistance occurring in the through hole.

The diameter of the through hole formed in the coupling member may be allowed to decrease in a steplike fashion toward its end connected to the master cylinder, forming stepped parts in the through hole, and the biasing member may be constructed by a coil spring. The coil spring, the valve element and the valve seat are placed on a common axis in the through hole, a fixed end of the coil spring and the valve seat are respectively supported by the stepped parts, and the valve element is made movable along its axis.

In this construction, the diameter of the through hole in the coupling member is reduced in a steplike fashion so that the coil spring pushing the valve element and the valve seat placed on a common axis are supported by the individual stepped parts. This make it possible to reduce the size of the coupling member incorporating the restriction mechanism.

A coupling having a restriction mechanism for a clutch-actuating device comprises a cylindrical member having a cylinder-connecting part to be connected to a port of a master cylinder or an operating cylinder at one end and a conduit-connecting part to be connected to a conduit at the other end. The restriction mechanism which restricts the flow of hydraulic fluid returning from the operating cylinder to the master cylinder is incorporated in a through hole formed in the cylindrical member.

In this coupling having the restriction mechanism, the cylindrical member has the cylinder-connecting part to be connected to the port of the master cylinder or the operating cylinder at one end and the conduit-connecting part to be connected to the conduit at the other end, and the restriction mechanism is incorporated in the through hole formed in the cylindrical member. This construction makes it possible to add the torque shock preventing function to an existing cylinder by just connecting the coupling having the restriction mechanism.

A conduit unit for a clutch-actuating device comprises the above-defined coupling having the restriction mechanism, a coupling having a cylinder-connecting part to be connected to a port of a master cylinder or an operating cylinder at one end and a conduit-connecting part to be connected to a conduit at the other end, and a conduit for connecting the coupling having the restriction mechanism to the coupling.

With this conduit unit for the clutch-actuating device, the coupling having the restriction mechanism and the coupling having no restriction mechanism are connected by the conduit. If the cylinder-connecting part of each coupling has a common structure, the restriction mechanism can be easily incorporated in a line connected to either the master cylinder or the operating cylinder, so that the conduit unit of the invention allows for flexibility in the design of hydraulic circuit layout.

This application is based on patent application Nos. 2000-125576 and 2001-69868 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A clutch-actuating device comprising:
    a master cylinder to be actuated by depression of a clutch pedal;
    an operating cylinder to be actuated by fluid pressure fed from the master cylinder;
    a coupling member detachably mounted directly to at least one of the master cylinder and the operating cylinder;
    a conduit connected between the master cylinder and the operating cylinder via the coupling member for permitting hydraulic fluid to flow between the master cylinder and the operating cylinder; and
    a restriction mechanism for restricting the flow of hydraulic fluid returning from the operating cylinder to the master cylinder, the restriction mechanism being incorporated in the coupling member.

2. The clutch-actuating device according to claim 1, wherein the restriction mechanism includes a flow control valve provided in a through hole formed in the coupling member.

3. The clutch-actuating device according to claim 2, wherein the flow control valve includes:
    a valve seat formed at one end of the through hole connected to the master cylinder;
    a valve element which is operable to come into contact with and separate from the valve seat, the valve element having a restriction aperture; and
    a biasing member which pushes the valve element against the valve seat;
    wherein the valve element moves apart from the valve seat against pushing force of the biasing member when the hydraulic fluid is supplied from the master cylinder, and the valve element comes into contact with the valve seat when the hydraulic fluid returns to the master cylinder, allowing the hydraulic fluid to pass only through the restriction aperture to thereby limit the flow rate of returning hydraulic fluid.

4. The clutch-actuating device according to claim 3, wherein the restriction aperture is formed in a cylindrical shaft extending from the valve element along the through hole.

5. The clutch-actuating device according to claim 4, wherein the diameter of the through hole formed in the coupling member decreases in a steplike fashion toward its end connected to the master cylinder, forming stepped parts in the through hole, and the biasing member is formed of a coil spring, and wherein the coil spring, the valve element and the valve seat are placed on a common axis in the through hole, a fixed end of the coil spring and the valve seat are respectively supported by the stepped parts, and the valve element is made movable along its axis.

6. The clutch-actuating device according to claim 3, wherein the diameter of the through hole formed in the coupling member decreases in a steplike fashion toward its end connected to the master cylinder, forming stepped parts in the through hole, and the biasing member is formed of a coil spring, and wherein the coil spring, the valve element and the valve seat are placed on a common axis in the through hole, a fixed end of the coil spring and the valve seat are respectively supported by the stepped parts, and the valve element is made movable along its axis.

7. The clutch-actuating device according to claim 1, wherein the coupling member includes a cylindrical member having a space for accommodating the restriction mechanism and an attachment groove formed in an outer surface of the cylindrical member, and at least one of the master cylinder and the operating cylinder is formed with a connecting hole for receiving a part of the cylindrical member, and wherein the coupling member is detachably mounted directly to one of the master cylinder and the operating cylinder by a spring pin disposed between the attachment groove of the coupling cylinder and an inner surface of the connecting hole.

8. A conduit unit for a clutch-actuating device, the conduit unit comprising:
   a first coupling including:
      a cylindrical member including:
         a cylinder-connecting part to be detachably connected directly to at least one of a port of a master cylinder and an operating cylinder at one end; and
         a conduit-connecting part to be connected to a conduit at the other end;
      a restriction mechanism which is provided in the cylindrical member and restricts the flow of hydraulic fluid returning from the operating cylinder to the master cylinder;
   a second coupling including:
      a cylinder-connecting part to be connected to at least one of a port of a master cylinder and an operating cylinder at one end; and
      a conduit-connecting part to be connected to a conduit at the other end; and
   a conduit for connecting the first coupling to the second coupling.

9. The conduit unit according to claim 8, wherein the cylindrical member is formed with an attachment groove in an outer surface thereof, the attachment groove is adapted for accommodating a spring pin to keep the coupling member in at least one of the master cylinder and the operating cylinder.

\* \* \* \* \*